US005988147A

United States Patent [19]

Everingham

[11] Patent Number: 5,988,147

[45] Date of Patent: Nov. 23, 1999

[54] EXHAUST GAS RECIRCULATION VALVE WITH FLOATING VALVE ASSEMBLY

[75] Inventor: Gary Everingham, Chatham, Canada

[73] Assignee: Siemens Canada Limited, Chatham, Canada

[21] Appl. No.: 08/909,134

[22] Filed: Aug. 11, 1997

Related U.S. Application Data

[62] Division of application No. 08/754,572, Nov. 21, 1996, Pat. No. 5,669,364.

[51] Int. Cl.[6] ............................ F02B 47/08; F02M 25/07

[52] U.S. Cl. ....................................... 123/568; 123/568.26

[58] Field of Search ..................................... 123/568, 569, 123/571, 90.11, 339.27, 568.18, 568.26; 251/129.15, 129.16; 335/255, 261

[56] References Cited

U.S. PATENT DOCUMENTS

| | | | |
|---|---|---|---|
| 4,312,494 | 1/1982 | Aoyama | 251/129.15 |
| 4,515,343 | 5/1985 | Pischinger et al. | 123/90.11 |
| 4,538,569 | 9/1985 | Sugino et al. | 123/90.11 |
| 4,682,574 | 7/1987 | Kreuter | 123/90.11 |
| 5,094,218 | 3/1992 | Everingham et al. | 123/571 |
| 5,460,146 | 10/1995 | Frankenberg | 123/571 |
| 5,494,255 | 2/1996 | Pearson et al. | 251/129.15 |
| 5,626,165 | 5/1997 | Shinobu | 251/129.15 |

OTHER PUBLICATIONS

Patent Abstracts of Japan, JP6249032, Jun. 9, 1994, Application No. JP930039863, Dated Jan. 3, 1993 for Motor Driving Actuator, 1 page.

*Primary Examiner*—Willis R. Wolfe

[57] ABSTRACT

An installation for an exhaust gas recirculation valve in which the valve is mounted directly in the intake manifold, a tubular base piece receiving exhaust gas mounted in an opening in the manifold by a double-walled thin metal heat gradient element. An attached solenoid housing is mounted in an opening in an opposite manifold wall. An operating rod having an attached valve element is actuated by a pushing force generated by energization of the solenoid, the valve element controlling the flow of exhaust gas out of a valve seat in a partition in the tubular base piece and out of the tubular base piece into the air flow in the air induction ducting. The solenoid is designed by allow controlled proportionate opening movement of the valve element to correspondingly control the volume of exhaust gas diverted into the manifold air flow. The valve is cooled by air flow within the air induction duct to prevent heat damage to the manifold and the solenoid components are isolated from direct exposure to exhaust gas.

21 Claims, 2 Drawing Sheets

EXHAUST GAS RECIRCULATION VALVE WITH FLOATING VALVE ASSEMBLY

This is a divisional of application Ser. No. 08/754,572 filed Nov. 21, 1996, now U.S. Pat. No. 5,669,364.

BACKGROUND OF THE INVENTION

This invention concerns installations for exhaust gas recirculation valves. ERG valves are used to control the introduction exhaust gas into the intake manifold of an internal combustion engine in order to reduce engine emissions by lowering peak combustion temperatures reached in the engine cylinders. A first pipe typically extends from the exhaust system to the EGR valve and a second pipe extends from the EGR valve to the intake manifold, with a variable volume of exhaust gas caused to be diverted into the manifold air flow by operation of the EGR valve. The EGR valve is typically installed directly on the engine with a heavy cast iron pedestal.

The high temperatures of the exhaust gas tends to overheat the EGR valve, requiring special designs to avoid early failure of the internal components, namely the electrical solenoid used to operate the valve. The cast iron pedestal also adds appreciably to vehicle weight, which has become of greater concern in recent years.

An engine weight reducing innovation adopted in recent years is the use of molded plastic-composite engine intake manifolds.

This construction of the intake manifold has required particular measures to be taken to allow the hot exhaust gases to be introduced into the air flow while preventing heat damage to the manifold.

Another problem heretofore associated with EGR valves has been the fouling of moving parts in the EGR valve resulting from being exposed to exhaust gas under the pressures existing in the exhaust system. The exhaust gas and contaminants sometimes penetrate clearance spaces when they are exposed to the exhaust gas under the positive pressures of received from the exhaust system, leaving deposits which interfere with proper valve operation.

It is an object of the present invention to provide a lightweight and compact EGR valve installation for a molded intake manifold which avoids excessive heating of the intake manifold structure.

It is another object to provide an EGR valve installation which reduces fouling of the valve components by exposure to exhaust gas.

SUMMARY OF THE INVENTION

The above-recited objects are accomplished by nesting the EGR valve into the molded composite intake manifold ducting to eliminate a separate pedestal and to cool the valve by the air flow in the manifold to avoid heat damage to the manifold.

An elongated tubular base piece is mounted extending into manifold ducting through a hole in a wall of the intake manifold ducting, and a pipe connects a protruding end of the base piece to the exhaust manifold to divert a portion of the engine exhaust gases into the interior of the base piece.

A double-walled heat gradient element is interposed between the outside of the tubular base piece and the ducting wail which element has radially spaced inner and outer walls to reduce conductive heating of the intake manifold structure by the tubular base piece which is heated to a high temperature by direct exposure to the hot exhaust gases.

A solenoid housing is mounted in a hole in an opposite wall of the intake manifold air ducting, the end of the tubular base piece within the ducting connected to the solenoid housing. A valve element is normally urged onto a frustoconical valve seat to prevent flow of exhaust gas from the interior of the tubular base into the manifold ducting. The valve element is moved off the valve seat by a pushing force generated by energization of the solenoid, opening to an extent corresponding to the magnitude of the electrical voltage supplied to the solenoid coil. This allows a controlled volume of exhaust gases to flow out through a cross port in the tubular base piece located away from the adjacent manifold ducting walls, the exhaust gas thus introduced into a central region of the intake manifold air flow.

A first spring urges the valve element towards the closed position on the valve seat, while a second weaker spring urges the valve element towards the open position, with the solenoid magnetic field generating a pushing force sufficient to open the valve against the spring forces and also the manifold vacuum and exhaust pressure forces tending to close the valve. An equilibrium condition is reached between the increasing resistance of the spring forces and the magnetically generated force at successive progressively further opened positions achieved with increasing power levels applied to the solenoid coil.

According to one aspect of the present invention, the solenoid includes a pair of annular stators, with the one stator having a rim of tapered thickness to create a flux pattern which allows the progressive positioning of an armature driving the valve element, the armature stabilized in various successive positions corresponding to the voltage applied to the solenoid coil.

A position sensor is mounted to the solenoid housing, generating feedback signals corresponding by movement of the valve element to allow precise control over the extent of opening movement of the valve by signals from the engine controls.

The solenoid and tubular base piece are cooled by being positioned in the flow of air within the manifold air ducting, reducing the heat stress on those components and the heating of the manifold walls, which effect is assisted by the use of the double-walled, thin metal heat gradient element.

The separate pedestal used in prior installations is eliminated by mounting of the EGR valve nested within the intake manifold ducting.

The push-to-open solenoid action allows an arrangement in which the valve element when closed isolates the solenoid components from the exhaust system gases under positive pressure to be directed into the air intake ducting. This avoids directly exposing the solenoid components to the exhaust gases under the pressures existing in the exhaust system to thereby reduce the tendency for fouling of those components.

DETAILED DESCRIPTION

Figure 1:
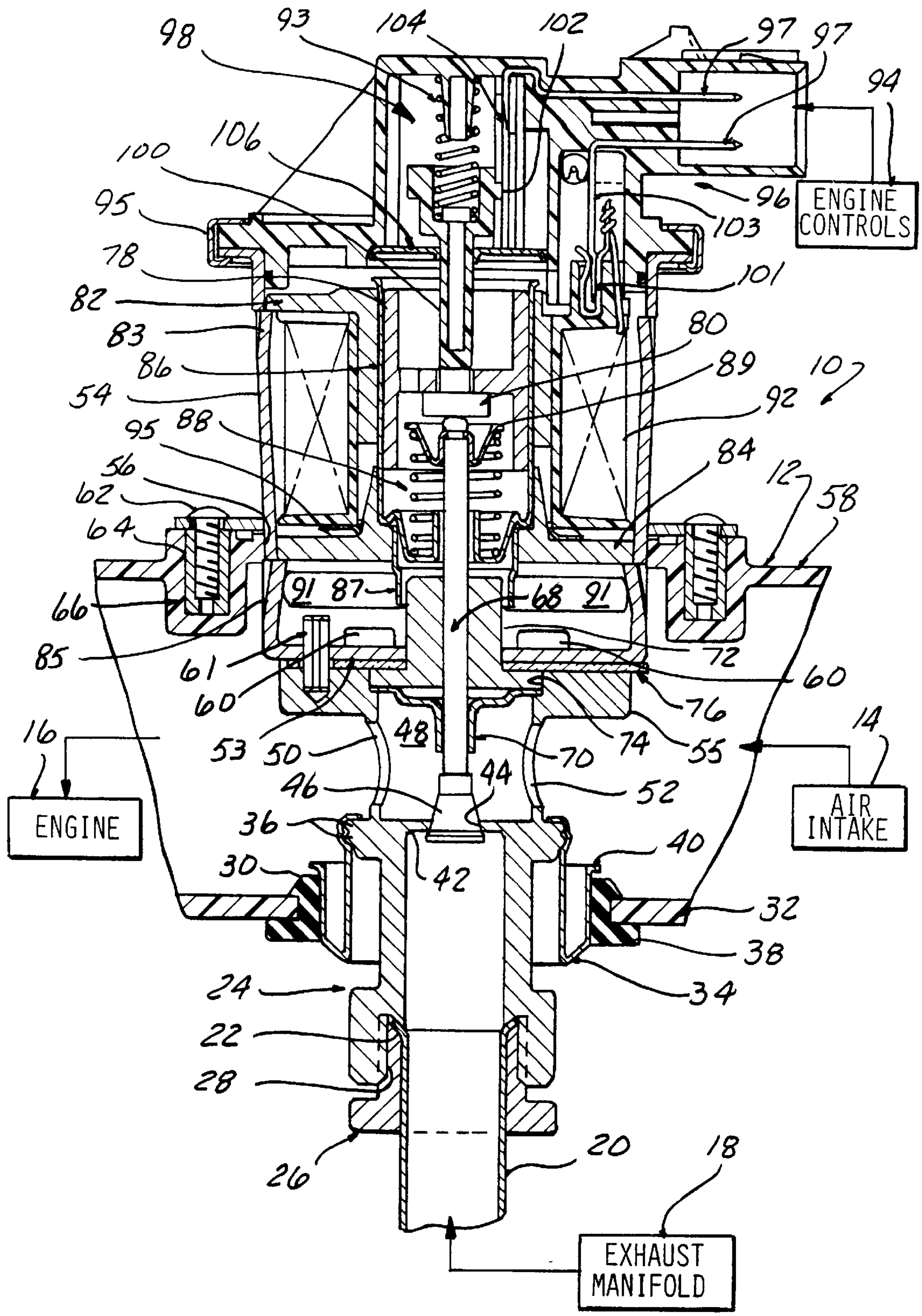
FIG. 1 is a sectional view taken through an EGR valve installation according to the present invention, with associated portions of an intake manifold shown in fragmentary sectional form.
Figure 3:
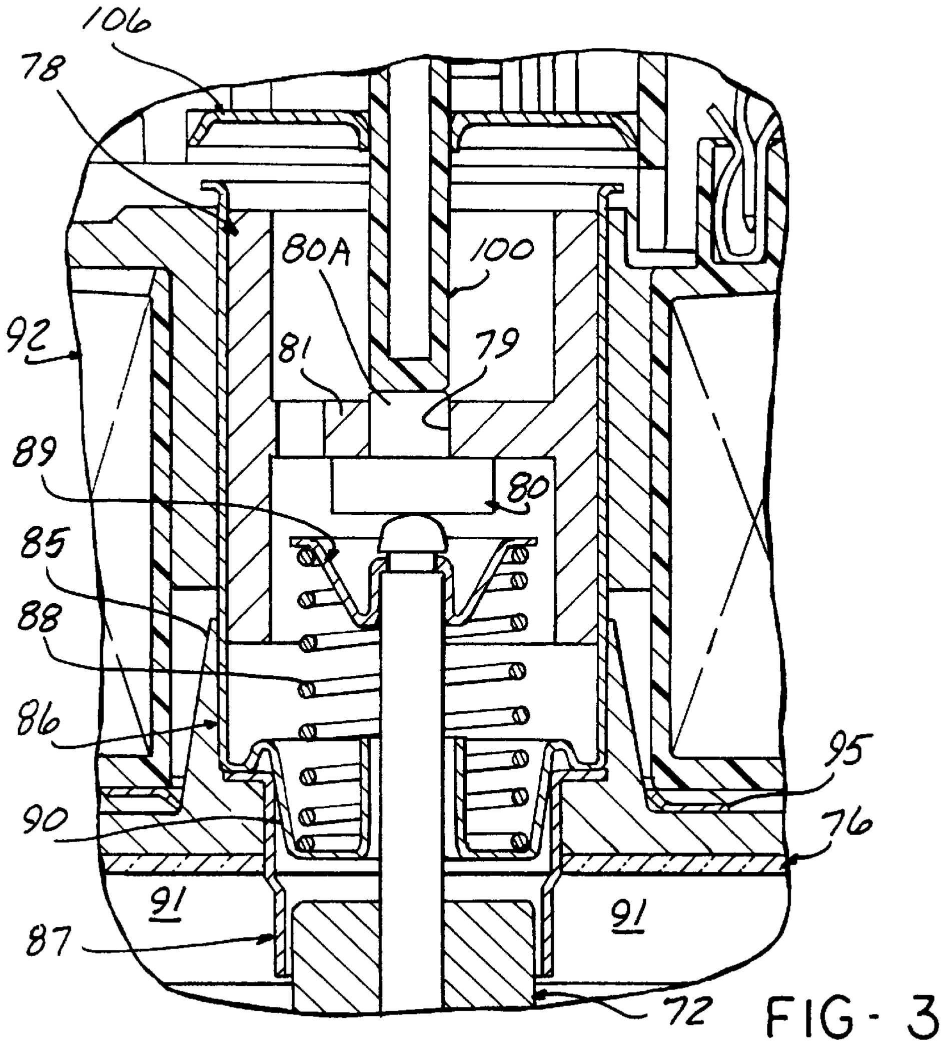
FIG. 3 is an enlarged fragmentary sectional view of a lower portion of the EGR valve shown in FIG. 1.
Figure 2:
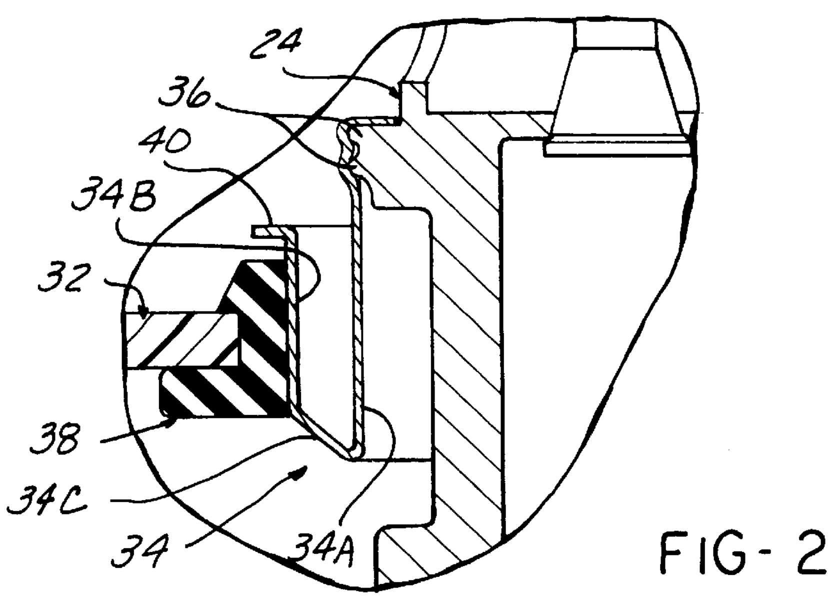
FIG. 2 is an enlarged fragmentary sectional view of an upper portion of the EGR valve shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, an exhaust gas recirculation or EGR valve 10 is shown installed within an air induction plenum ducting 12 of a molded plastic composite intake manifold, which ducting receives air flow from a throttle housing air intake 14 and directs the same into the intake ports of an engine 16 via a series of manifold runners (not shown) in the well known manner.

The EGR valve 10 produces a diversion of a variably controlled volume of exhaust gas into the air flow within the plenum ducting 12. The exhaust gas flows from the exhaust manifold 18 via a connecting pipe 20, which has a flange 22 clamped against a counterbore in a heavy-walled tubular base piece 24, with an attachment nut 26 advanced into a threaded bore 28, as shown. The tubular base piece 24 is preferably constructed of nodular iron, as it can be cast with minimal porosity.

The EGR valve 10 is installed in the top and bottom walls 32, 58 of intake manifold plenum ducting 12 so as to be largely nested and contained within the ducting 12 and entirely supported thereby.

The cast iron tubular base piece 24 extends into the ducting 12, held in an opening 30 in the bottom plenum wall 32 by a double-walled, thin metal heat gradient element 34 which has one end of an inner wall 34A magna formed onto a series of ridges 36 on the exterior of the tubular base piece 24.

The heat gradient element 34 is of an annular shape, having a double wall formed by inner wall 34A and a reversely extending outer wall 34B radially spaced therefrom, the walls 34A, 34B connected by a radially extending end section 34C. The radial spacing from the outside surface of the tubular base piece 24 and the convoluted shape of the thin metal heat gradient element 34 greatly reduces the conductive heat transfer from the base piece 24 into the manifold ducting bottom wall 32.

An annular silicone seal 38 is secured in the opening 30 and receives the heat gradient element 34. A radial flange 40 on the heat gradient element 34 limits movement through the seal 38, which is itself held axially located in the opening 30 by a groove fitted to the bottom wall 32.

A partition wall 42 formed in the tubular base piece 24 has a valve seat 44 formed therein, such that the position of a tapered valve element 46 can control the flow of exhaust gas into a chamber 48 openly communicating with the interior of the plenum ducting 12 through a port 50 located in the middle of the interior of the plenum ducting 12. The central location of the port 50 allows the exhaust gas to enter the ducting 12 at a point well away from the walls thereof to avoid direct heating of the manifold by impingement of the hot exhaust gases.

A second port 52 on the upstream side may be provided to improve air cooling of the tubular base piece 24 by allowing air flow through the chamber 48.

The tapering down of the valve element 46 is in a direction toward an attached actuator rod 68 such that it will engage the valve seat 44 so as to be closed by an upward pulling motion of the rod 68, and is opened by a downward pushing movement of the rod 68. This arrangement has the advantage of isolating the chamber 48 from the upstream exhaust gas and thus not subjecting the solenoid parts exposed in chamber 48 to exhaust gas under the positive pressure existing in the exhaust system. If exhaust gas was held in the chamber 48, this might allow penetration of the exhaust gas into the small clearance spaces and to thereby cause fouling of the moving parts, as well as increased heating of the solenoid components.

The upper end of the tubular base piece 24 is attached to a formed metal solenoid housing 54 mounted in an opening 56 in an upper wall 58 of the air induction plenum 12 by a series of screws 60 passed through the bottom wall 53 of the solenoid operator housing 54 and into threaded holes in a flange 55 of the base 24. A locating roll pin 61 is used to initially align the housing 54 on the flange 55 during assembly. A series of threaded fasteners 62 are received in threaded inserts 64 molded into bosses 66 in the upper wall 58 arrayed around the opening 56.

The tapered valve element 46 is positioned by means of the attached actuator rod 68, which extends upwardly through a central bore in an annular shield 70 and in a bore in a bronze bushing 72, each having outer flanges received in a counterbore 74 in flange 55 and clamped against a mica gasket 76 when the bottom wall 53 of the housing 54 is attached to the upper end of the tubular base 24.

A shield 87 deflects the flow of contaminants which might enter vent openings 91 in housing 54 to prevent them from passing into the spaces within solenoid components.

The actuator rod 68 is urged upwardly against a replaceable armature plug 80 having a stern 80A press fit into a bore 79 of a web 81 of a solenoid armature 78.

The ferromagnetic armature 78 is slidable inside an annular ferromagnetic upper stator 82 and lower stator 84, guided within a thin-walled metal canister 86.

The upper stator 82 is located atop inwardly punched features 83 of the housing 54 while lower stator 84 rests on lower inwardly punched features 85.

A first compression spring 88 drivingly engages the rod 68, urging it upward towards a valve closing position.

The first spring 88 is confined between a radially inward cup 90 of the canister 86 providing a reaction structure for the spring 88, and a spring retainer 89 snap fitted into a groove in the upper end of the rod 68.

The armature 78 and rod 68 are urged downwardly to an opening position of the valve element 46 by a second spring 93 which acts in opposition to spring 88 through the action of a sensor plunger 100 engaging the top of the plug 80 The second spring 93 is weaker than first spring 88 so that the net spring force acting on the rod 68 is in the upward, closing direction.

A solenoid coil 92 is disposed in housing 54 and rests on a wave washer 95 which allows accommodation of differential temperature expansion of solenoid coil 92 and the various other parts.

The solenoid coil 92 is adapted to be energized by an electrical current caused to be directed to the coil 92 by the engine controls 94 which are connected via an electrical connector 96.

The armature 78 and stators 82, 84 form part of a electromagnetic flux path when the solenoid coil 92 is energized, generating a force overcoming the spring forces and the vacuum in ducting 12, and the positive pressure in pipe 20, all acting on the valve element 46 to cause the armature 78 and rod 68 to be pushed down a distance proportional to the magnitude of the electrical current supplied to the solenoid coil S2. This unseats the valve element 46 to a controlled extent, and allows an inflow of a corresponding volume of exhaust gas into the ducting 12.

In typical solenoids, the magnetically generated force increases with increasing travel of the armature so that once armature movement is initiated, completion of full travel follows. The solenoid used here differs to allow various stabilized positions of the valve element 46, each corresponding to a respective level of electrical power applied to the solenoid coil 92. The initial force acting on the armature 78 and generated by the solenoid coil 92 is at a maximum to initiate opening.

The lower stator 84 has a tapered upper rim 85 which affects the magnetic flux pattern to decrease the magnetically generated force over distance as the armature 78 approaches the lower stator 84 so that an equilibrium is quickly reached with the increasing spring force as the armature 78 moves to open the valve 46. Thus, a stable position of the armature 78 (and valve element 46) is achieved for each level of electrical power applied to the solenoid coil 92.

This allows a proportioned partial opening of the valve element 46 by appropriate automatically controlled adjustment of the energization current.

The position of the rod 68 depends on the vector summing of all of the forces including that of the springs 88, 93, the vacuum in the ducting 12, the positive pressure in pipe 20, and the force generated by the magnetic field of the energized solenoid 92. A calibrated system is set by installing a properly sized plug 80 to achieve a desired valve opening at a proper sensor signal level and coil energization level.

Electrical signals corresponding to the position of the valve 46 are generated by a sensor 98 mounted atop the housing 54, having an input plunger 100 spring-loaded against an upper end of the plug stem 80A by a second spring 93. Movement of a contact 102 linearly along conductive resistance tracks 104 create a varying voltage drop in the manner of a potentiometer to generate electrical signals corresponding to the position of the valve element 46.

A stainless steel cover 106 closes off the interior of the sensor 98 to protect the same from contamination.

Suitable resistance potentiometers of a suitable type are known to those skilled in the art, such as potentiometers by Mikuni Corporation. According to such known technology, the tracks 104 carry a baked-on conductive ink pattern forming a semi-conductor pattern, the tracks 104 bridged by sliding contact 102 to generate varying electrical signals comprised of the varying electrical potential at each position of the plunger 100. Since this technology is well known, further details are not here provided.

These signals are transmitted back to the engine controls 94 via a series of contacts 97, connected by a suitable connector and cable (not shown), to allow the proper extent of valve opening to be achieved by a feedback circuit in the well known manner by generating a corresponding electrical current to be transmitted to the solenoid coil 92 via the contacts 99.

The connector 96 is assembled onto the solenoid housing 54 and held with a cramped ring 95. An electrical connection is made with blade contacts 103 received in receptacle contact 101.

The air flow cools the tubular base piece 24 to reduce conductive heating of the manifold walls and also to cool the solenoid components to improve their service life.

The separate mounting pedestal is eliminated, and a compact installation also results by the EGR valve 10 being largely nested within the intake manifold itself.

I claim:

1. A valve assembly comprising:

a housing;

a solenoid assembly mounted in the housing, the solenoid assembly including an armature that moves upon energization of a coil;

a floating valve assembly operatively engaged with the solenoid assembly, the floating valve assembly including an operating rod with a valve element configured to engage a valve seat, the operating rod extending toward the solenoid assembly and engaging the armature to form a single load operative connection between the solenoid assembly and the floating valve assembly, the floating valve assembly comprising a spring that forces the operating rod into engagement with the armature;

a spring retainer disposed on the operating rod proximate the rod head, the spring retainer comprising an annular lip that engages the compression spring so that the armature is free to slide an a crown of the rod head; and a replaceable plug mounted to the armature that is engaged by the rod head of the operating rod.

2. A method of providing a solenoid actuated valve assembly, comprising the steps of:

providing a solenoid assembly with an armature that moves upon energization of a coil;

engaging an operating rod of a valve assembly at a single operative connection on the armature; and supporting the operating rod with a single bushing;

wherein the step of engaging further comprises biasing a rod head of the operating rod with a spring into the single operative connection on the armature;

wherein the step of engaging further comprises disposing a spring retainer onto the operating rod proximate the rod head so that the armature is free to slide on a crown of the rod head; and wherein the step of disposing further comprises mounting a replaceable plug on the armature for engagement by the crown of the rod head.

3. An exhaust gas recirculation valve comprising:

a body having an internal main flow passage between a first and second port;

a valve seat circumscribing a transverse cross-sectional area of the passage;

a valve element that selectively seats on and unseats from the valve seat;

an operating rod extending from the valve element;

an armature that operates the valve element, the armature having on opposite ends, respective apertures extending into the armature from each respective opposite end, and a transverse wall disposed between the apertures;

a sensor that senses a position of the armature including a sensor shaft extending into one of the apertures to bear against the transverse wall; and a rod head of the operating rod extending into the other of the apertures to also bear against the transverse wall.

4. The exhaust gas recirculation valve of claim 3, wherein a replaceable plug is disposed within the transverse wall and both the sensor shaft and rod head bear against the transverse wall.

5. An exhaust gas recirculation valve assembly comprising:

a housing;

a solenoid assembly mounted in the housing, the solenoid assembly including an armature that moves upon energization of a coil; and a floating valve assembly operatively engaged with the solenoid assembly, the floating valve assembly including an operating rod, the operating rod having a valve element configured to engage a valve seat and a longitudinal axis;

wherein the operating rod extends toward the solenoid assembly and engages the armature to form a single load operative connection between respective bearing surfaces of the solenoid assembly and the floating valve assembly; and wherein the longitudinal axis contacts both of the respective bearing surfaces.

6. The exhaust gas recirculation of claim 5, wherein the bearing surface of the operating rod comprises less than the cross-sectional area of the operating rod.

7. A valve assembly comprising:

a housing;

an armature that moves within the housing upon energization of a coil;

a plug mounted to the armature;

an operating rod proximate the armature, the operating rod having a rod head and a valve element, the valve element configured to engage a valve seat; and a biasing member that forces the rod head and the plug into operative engagement.

8. The valve assembly of claim 7, wherein the biasing member comprises a first spring.

9. The valve assembly of claim 8, further comprising a spring retainer snap fitted into a groove in the operating rod proximate the rod head.

10. The valve assembly of claim 9, wherein the spring retainer comprises an annular lip that engages the first spring so that the armature via the plug is free to slide on a crown of the rod head.

11. A valve assembly comprising:

a housing;

an armature that moves within the housing upon energization of a coil;

an operating rod proximate the armature, the operating rod having a rod head and a valve element, the valve element configured to engage a valve seat;

a biasing member that forces the rod head and the armature into operative engagement, the biasing member comprising a first spring;

a spring retainer snap fitted into a groove in the operating rod proximate the rod head, the spring retainer comprising annular lip that engages the first spring so that the armature is free to slide on a crown of the rod head; and a replaceable plug mounted to the armature that is engaged by the rod head of the operating rod.

12. The valve assembly of claim 11, wherein the first spring comprises a first compression spring that forces the operating rod toward a solenoid assembly that includes the armature, and the first compression spring positions a valve element on a valve seat, and a second compression spring weaker than the first compression spring acts on the operating rod to assist in moving the valve element from the valve seat when the solenoid assembly magnetically generates a force that moves the armature to push the valve element from the valve seat.

13. The valve assembly of claim 12, further comprising a position sensor coupled to the operating rod and mounted to the housing, the position sensor producing signals corresponding to a position of the operating rod and the valve element.

14. The valve assembly of claim 13, wherein the position sensor includes a plunger acted on by the second spring to be urged into driving engagement with the armature.

15. The valve assembly of claim 14, wherein the valve assembly comprises an electric exhaust gas recirculation valve.

16. A valve assembly comprising:

a housing;

a solenoid assembly mounted in the housing, the solenoid assembly including an armature that moves upon energization of a coil, the armature having a plug mounted therein; and a floating valve assembly operatively engaged with the solenoid assembly, the floating valve assembly including an operating rod with a valve element configured to engage a valve seat, the operating rod extending toward the solenoid assembly and engaging the plug of the armature to form a single load operative connection between the solenoid assembly and the floating valve assembly.

17. The valve assembly of claim 16, wherein the solenoid assembly further comprises a fixed upper stator and a fixed lower stator; and wherein the armature is movable within the fixed upper stator and the fixed lower stator.

18. The valve assembly of claim 16, wherein the valve assembly comprises an electric exhaust gas recirculation valve.

19. The valve assembly of claim 16, wherein the floating valve assembly comprises a spring that forces the operating rod into engagement with the armature.

20. The valve assembly of claim 19, further comprising a spring retainer disposed on the operating rod proximate the rod head.

21. The valve assembly of claim 20, wherein the spring retainer comprises an annular lip that engages the compression spring so that the armature is free to slide an a crown of the rod head.

* * * * *